US005515260A

United States Patent [19]

Watanabe et al.

[11] Patent Number: 5,515,260

[45] Date of Patent: May 7, 1996

[54] CURRENT-VOLTAGE CONVERSION CIRCUIT, CURRENT COMPRESSING AND EXTENSION CIRCUIT, AUTOMATIC EXPOSURE CONTROL SYSTEM, AND AUTOMATIC EXPOSURE CONTROL SYSTEM WITH BUILT-IN SENSOR

[75] Inventors: Fumihiro Watanabe, Hyogo; Fumihide Murao, Kanagawa; Hiroshi Murakami, Hyogo; Hideo Hara, Hyogo; Hideho Itoh, Hyogo; Tatsuya Hohmoto, Hyogo, all of Japan

[73] Assignees: Mitsubishi Electric Engineering Co., Ltd.; Mitsubishi Denki Kabushiki Kaisha, both of Tokyo, Japan

[21] Appl. No.: 432,814

[22] Filed: May 2, 1995

[30] Foreign Application Priority Data

Aug. 24, 1994 [JP] Japan .................................... 6-199605

[51] Int. Cl.$^6$ ............................... H02M 7/00; G05F 1/40

[52] U.S. Cl. ............................................... 363/73; 323/280

[58] Field of Search .............................. 363/73; 323/280, 323/281, 282, 312, 313, 315, 316; 327/534, 535, 542, 538; 257/549, 550, 552, 553, 592

[56] References Cited

U.S. PATENT DOCUMENTS

| | | | |
|---|---|---|---|
| 4,618,814 | 10/1986 | Kato et al. | 363/73 |
| 5,157,352 | 10/1992 | Chickanosky, Jr. et al. | 330/289 |
| 5,225,766 | 7/1993 | O'Neill | 323/280 |
| 5,324,982 | 6/1994 | Nakazato et al. | 257/546 |
| 5,341,087 | 8/1994 | Van Leeuwen | 363/73 |
| 5,381,082 | 1/1995 | Schlicht | 323/280 |

*Primary Examiner*—Matthew V. Nguyen

*Attorney, Agent, or Firm*—Oblon, Spivak, McClelland, Maier, & Neustadt

[57] ABSTRACT

A current-voltage conversion circuit which is capable of performing logarithmic compression is obtained using only CMOS processes. An emitter of a PNP transistor (10) and a current input terminal (51) are connected commonly to a reverse input terminal of an operational amplifier (53), while a first reference voltage input terminal is connected to a non-reverse input terminal of the operational amplifier (53). A collector of the PNP transistor (10) is grounded and a base of the PNP transistor (10) is connected to an output terminal of the operational amplifier (53) and an output terminal (55). A current (I) is supplied to the current input terminal (51) while a first reference voltage ($V_{REF1}$) is applied to the first reference voltage input terminal. The PNP transistor (10) is formed by CMOS processes. The current-voltage conversion circuit is manufactured in a shorter manufacturing time and at a reduced cost.

5 Claims, 12 Drawing Sheets

101

10 (11, 12, 21, 22)

104

105

203

204

CURRENT-VOLTAGE CONVERSION CIRCUIT, CURRENT COMPRESSING AND EXTENSION CIRCUIT, AUTOMATIC EXPOSURE CONTROL SYSTEM, AND AUTOMATIC EXPOSURE CONTROL SYSTEM WITH BUILT-IN SENSOR

BACKGROUND OF THE INVENTION

1. Field of the Invention

The present invention relates to a current-voltage conversion circuit, a current compression and extension circuit, an automatic exposure control system, and an automatic exposure control system with a built-in sensor, all utilizing CMOS processes.

2. Description of the Background Art (a-1) First Background Art

FIG. 11 is a circuitry diagram of a conventional current-voltage conversion circuit 201. The current-voltage conversion circuit 201 comprises an operational amplifier 53 and a diode 54. A current input terminal 51 is connected to a reverse input terminal of the operational amplifier 53 while a first reference voltage input terminal 52 is connected to a non-reverse input terminal of the operational amplifier 53. A voltage output terminal 55 and a cathode of the diode 54 are connected commonly to an output terminal of the operational amplifier 53. An anode of the diode 54 is connected to the current input terminal 51.

When a reference voltage $V_{REF1}$ is applied to the first reference voltage input terminal 52 and a current I is supplied to the current input terminal 51, the current I flows into the diode 54 so that a voltage $V_{BE}$ which is obtained by compressing the current I by logarithmic compression is developed across the diode 54.

$$V_{BE}=\frac{kT}{q}\ln\frac{I}{I_S} \tag{1}$$

where q: electric charge of an electron k: Boltzmann's constant

T: absolute temperature $I_s$: reverse saturation current

Hence, at the voltage output terminal 55, a voltage $V_{OUT}$ is outputted which is obtained by subtracting the logarithmically compressed voltage which is developed across the diode 54 from the reference voltage $V_{REF1}$ (See Eq. 2 below).

$$V_{out}=V_{REF1}-\frac{kT}{q}\ln\frac{I}{I_S} \tag{2}$$

(a-2) Second Background Art

FIG. 12 is a circuitry diagram of a conventional current compression and extension circuit 202. The current compression and extension circuit 202 is the same as the current-voltage conversion circuit 201 of FIG. 11 as it is modified to further comprise an NPN transistor 57. That is, the NPN transistor 57 has its emitter connected to the output terminal of the operational amplifier 53, its base connected to a second reference voltage input terminal 58 and its collector connected to an output terminal 56. Since a voltage which is expressed by Eq. 2 is supplied to the emitter of the transistor 57, when a reference voltage $V_{REF2}$ is applied to the second reference voltage input terminal 58, a current which is expressed by Eq. 3 is obtained from the output terminal 56.

$$I_{out}=I\cdot\exp\left[\frac{q}{kT}\cdot(V_{REF2}-V_{REF1})\right] \tag{3}$$

(a-3) Third Background Art

FIG. 13 is a circuitry diagram of a conventional automatic exposure control system 203. The automatic exposure control system 203 detects a current by an optical sensor and converts the current into a voltage in order to perform its intended control.

The automatic exposure control system 203 comprises operational amplifiers 62, 67 and 68, diodes 63 and 66 and current sources 61 and 65. To supply a current which is the same in volume as a current which is available from the optical sensor, the current source 61 is inserted between a reverse input terminal and a non-reverse input terminal of the operational amplifier 62. A voltage source 64 supplies a reference voltage $V_{REF1}$ to the non-reverse input terminal of the operational amplifier 62. An anode of the diode 63 is connected to the reverse input terminal of the operational amplifier 62. A cathode of the diode 63 is connected to an output terminal of the operational amplifier 62 which is connected to a non-reverse input terminal of the operational amplifier 67.

A reverse input terminal of the operational amplifier 67 is connected to the current source 65 and a cathode of the diode 66. An anode of the diode 66 is connected to the output terminal of the operational amplifier 67.

The output terminal of the operational amplifier 67 is further connected to a non-reverse input terminal of the operational amplifier 68. A reverse input terminal and an output terminal of the operational amplifier 68 are connected commonly to an output terminal 69.

When the current source 61 supplies a current I, a voltage available at the output terminal of the operational amplifier 62 is expressed by Eq. 2. Hence, by ensuring that the current source 65 supplies a current $I_O$and setting reverse saturation currents $I_S$ of the diodes 63 and 66 equal to each other, a voltage $V_{67}$ expressed by Eq. 4 is obtained at the output terminal of the operational amplifier 67.

$$\begin{aligned} V_{67} &= V_{REF1}-\frac{kT}{q}\ln\frac{I}{I_S}+\frac{kT}{q}\ln\frac{I_0}{I_S} \\ &= V_{REF1}-\frac{kT}{q}\ln\frac{I}{I_0} \end{aligned} \tag{4}$$

The operational amplifier 68 forms a voltage follower circuit to the voltage $V_{67}$ which appears at the output terminal of the operational amplifier 67, and therefore supplies the voltage $V_{67}$ to the output terminal 69. This allows the automatic exposure control system 203 to detect the current I. Based on the detected current I, the automatic exposure control system 203 outputs the voltage $V_{67}$ which is controlled by the reference voltage $V_{REF1}$ and the current $I_O$ while suppressing an impedance at the output terminal 69 low.

(a-4) Fourth Background Art

FIG. 14 is a circuitry diagram of a conventional automatic exposure control system with a built-in sensor 204. The automatic exposure control system with a built-in sensor 204 is the same as the automatic exposure control system 203 as it is modified to replace the current source 61 with an optical sensor 70. In the system 204, Eq. 4 is satisfied if a current flowing in the optical sensor 70 has a value I.

In the conventional current-voltage conversion circuit, the conventional current compression and extension circuit, the conventional automatic exposure control system, and the conventional automatic exposure control system with a built-in sensor above, the operational amplifiers 53, 62, 67 and 68 are formed using CMOS processes. On the other hand, the diodes 54, 63 and 66 are formed by bipolar transistors. Bipolar processes are also used to form the transistor 57 of the current compression and extension circuit 202.

To build these circuits and systems, not only CMOS processes but also bipolar processes are necessary. In other words, CMOS processes alone are insufficient to realize these circuits and systems. Bipolar processes are also needed.

SUMMARY OF THE INVENTION

A first aspect of the present invention is related to a current-voltage conversion circuit which comprises: (a) a current input terminal for receiving an input current; (b) a reference voltage input terminal for receiving a reference voltage; (c) an output terminal; (d) an operational amplifier formed in a first conductivity type semiconductor substrate, the operational amplifier including a reverse input terminal which is connected to the current input terminal, a non-reverse input terminal which is connected to the reference voltage input terminal and an output terminal which is connected to the output terminal; and (e) a bipolar transistor including an emitter which is connected to the reverse input terminal of the operational amplifier, a base which is connected to the output terminal of the operational amplifier, and a collector, wherein the bipolar transistor is formed by: (e-1) the semiconductor substrate which corresponds to the collector; (e-2) a first diffusion layer of a second conductivity type selectively formed on the semiconductor substrate, the first diffusion layer corresponding to the base; and (c-3) a second diffusion layer of the first conductivity type selectively formed on the first diffusion layer, the second diffusion layer corresponding to the emitter.

A second aspect of the present invention is directed to a current compression and extension circuit comprising: (a) a current input terminal for receiving an input current; (b) a first reference voltage input terminal for receiving a first reference voltage; (c) an output terminal; (d) an operational amplifier formed in a first conductivity type semiconductor substrate, the operational amplifier including a reverse input terminal which is connected to the current input terminal, a non-reverse input terminal and an output terminal; (e) a MOS transistor including a gate and a drain which are connected to the output terminal and the non-reverse input terminal of the operational amplifier, respectively, and a source which is connected to the output terminal, the MOS transistor receiving a voltage from the output terminal of the operational amplifier and forming a second conductivity type channel between the drain and the source; (f) a first bipolar transistor including an emitter which is connected to the reverse input terminal of the operational amplifier, a base which is connected to the first reference voltage input terminal, and a collector; and (g) a second bipolar transistor including an emitter which is connected to the non-reverse input terminal of the operational amplifier, a base which is connected to the first reference voltage input terminal, and a collector, wherein the first bipolar transistor is formed by: (f-1) the semiconductor substrate which corresponds to the collector of the first bipolar transistor; (f-2) a first diffusion layer of a second conductivity type selectively formed on the semiconductor substrate, the first diffusion layer corresponding to the base of the first bipolar transistor; and (f-3) a second diffusion layer of the first conductivity type selectively formed on the first diffusion layer, the second diffusion layer corresponding to the emitter of the first bipolar transistor, and wherein the second bipolar transistor is formed by: (g-1) the semiconductor substrate which corresponds to the collector of the second bipolar transistor; (g-2) a third diffusion layer of the second conductivity type selectively formed on the semiconductor substrate, the third diffusion layer corresponding to the base of the second bipolar transistor; and (g-3) a fourth diffusion layer of the first conductivity type selectively formed on the third diffusion layer, the fourth diffusion layer corresponding to the emitter of the second bipolar transistor.

Preferably, according to a third aspect of the present invention, the current compression and extension circuit of claim 2, further comprises: (h) a first resistor which is inserted between the base of the first bipolar transistor and the first reference voltage input terminal; (i) a second resistor which is inserted between the base of the second bipolar transistor and the first reference voltage input terminal; and. (j) a second reference voltage input terminal which is disposed at a connection point between the second resistor and the base of the second bipolar transistor, wherein the first resistor is formed by: (h-1) a fifth diffusion layer of the second conductivity type selectively formed on the semiconductor substrate; and (h-2) a sixth diffusion layer of the first conductivity type selectively formed on the fifth diffusion layer, and wherein the second resistor is formed by: (i-1) a seventh diffusion layer of the second conductivity type selectively formed on the semiconductor substrate; and (i-2) an eighth diffusion layer of the first conductivity type selectively formed on the fifth diffusion layer.

A fourth aspect of the present invention is directed to an automatic exposure control system comprising: (a) a current input terminal for receiving an input current; (b) a reference voltage input terminal for receiving a reference voltage; (c) a first operational amplifier formed in a first conductivity type semiconductor substrate, the operational amplifier including a reverse input terminal which is connected to the current input terminal, a non-reverse input terminal which is connected to the reference voltage input terminal, and an output terminal; (d) a first bipolar transistor including a base and an emitter which are connected to the output terminal and the reverse input terminal of the first operational amplifier, respectively, and a collector; (e) a second operational amplifier formed in the semiconductor substrate, the second operational amplifier including a non-reverse input terminal which is connected to the output terminal of the first operational amplifier, a reverse input terminal and an output terminal which are commonly connected; and (f) a second bipolar transistor including a base which is connected to the output terminal of the second operational amplifier, an emitter which receives a predetermined current, and a collector, wherein the first bipolar transistor is formed by: (d-1) the semiconductor substrate which corresponds to the collector of the first bipolar transistor; (d-2) a first diffusion layer of a second conductivity type selectively formed on the semiconductor substrate, the first diffusion layer corresponding to the base of the first bipolar transistor; and (d-3) a second diffusion layer of the first conductivity type selectively formed on the first diffusion layer, the second diffusion layer corresponding to the emitter of the first bipolar transistor, and wherein the second bipolar transistor is formed by: (f-1) the semiconductor substrate which corresponds to the collector of the second bipolar transistor; (f-2) a third diffusion layer of the second conductivity type selectively formed on the semiconductor substrate, the third diffusion layer corresponding to the base of the second bipolar transistor; and (f-3) a fourth diffusion layer of the first conductivity type selectively formed on the third diffusion layer, the fourth diffusion layer corresponding to the emitter of the second bipolar transistor.

A fifth aspect of the present invention is directed to an automatic exposure control system with a built-in sensor comprising: (a) a current input terminal for receiving an input current; (b) a reference voltage input terminal for receiving a reference voltage; (c) an optical sensor which is disposed between the reference voltage input terminal and the current input terminal; (d) a first operational amplifier formed in a first conductivity type semiconductor substrate, the operational amplifier including a reverse input terminal which is connected to the current input terminal, a non-reverse input terminal which is connected to the reference voltage input terminal, and an output terminal; (e) a first bipolar transistor including a base and an emitter which are connected to the output terminal and the reverse input terminal of the first operational amplifier, respectively, and a collector; (f) a second operational amplifier formed in the semiconductor substrate, the second operational amplifier including a non-reverse input terminal which is connected to the output terminal of the first operational amplifier, a reverse input terminal and an output terminal which are commonly connected; and (g) a second bipolar transistor including a base which is connected to the output terminal of the second operational amplifier, an emitter which receives a predetermined current, and a collector, wherein the optical sensor includes: (c-1) a first diffusion layer of a second conductivity type selectively formed on the semiconductor substrate; and (c-2) a second diffusion layer of the first conductivity type selectively formed on the first diffusion layer, the first bipolar transistor is formed by: (e-1) the semiconductor substrate which corresponds to the collector of the first bipolar transistor; (e-2) a third diffusion layer of the second conductivity type selectively formed on the semiconductor substrate, the third diffusion layer corresponding to the base of the first bipolar transistor; and (e-3) a fourth diffusion layer of the first conductivity type selectively formed on the third diffusion layer, the fourth diffusion layer corresponding to the emitter of the first bipolar transistor, and wherein the second bipolar transistor is formed by: (g-1) the semiconductor substrate which corresponds to the collector of the second bipolar transistor; (g-2) a fifth diffusion layer of the second conductivity type selectively formed on the semiconductor substrate, the fifth diffusion layer corresponding to the base of the second bipolar transistor; and (g-3) a sixth diffusion layer of the first conductivity type selectively formed on the fifth diffusion layer, the sixth diffusion layer corresponding to the emitter of the second bipolar transistor.

As described above, according to the first aspect of the present invention, it is possible to form the bipolar transistor using CMOS processes alone.

According to the second aspect of the present invention, it is possible to form the first and the second bipolar transistors using CMOS processes alone.

According to the third aspect of the present invention, it is possible to form the first and the second resistors using CMOS processes alone. The value of the outputted current is controlled by controlling the first and the second reference voltages.

According to the fourth aspect of the present invention, it is possible to form the first and the second bipolar transistors using CMOS processes alone. The potential at the emitter of the second bipolar transistor is controlled by controlling the current which is supplied to the emitter of the second bipolar transistor.

According to the fifth aspect of the present invention, it is possible to form the optical sensor, the first and the second resistors using CMOS processes alone. The value of the outputted current is controlled by controlling the first and the second reference voltages.

Thus, according to the present invention, it is possible to build these circuits and systems using CMOS processes alone without bipolar processes. Hence, these circuits and systems are manufactured in a shorter manufacturing time, which makes it possible to fabricate an integrated circuit at a reduced cost.

Accordingly, it is an object of the present invention to offer a technique in which CMOS processes alone are used to form a current-voltage conversion circuit, a current compression and extension circuit, an automatic exposure control system, and an automatic exposure control system with a built-in sensor.

These and other objects, features, aspects and advantages of the present invention will become more apparent from the following detailed description of the present invention when taken in conjunction with the accompanying drawings.

DESCRIPTION OF THE PREFERRED EMBODIMENTS (b-1) First Preferred Embodiment

Figure 1:
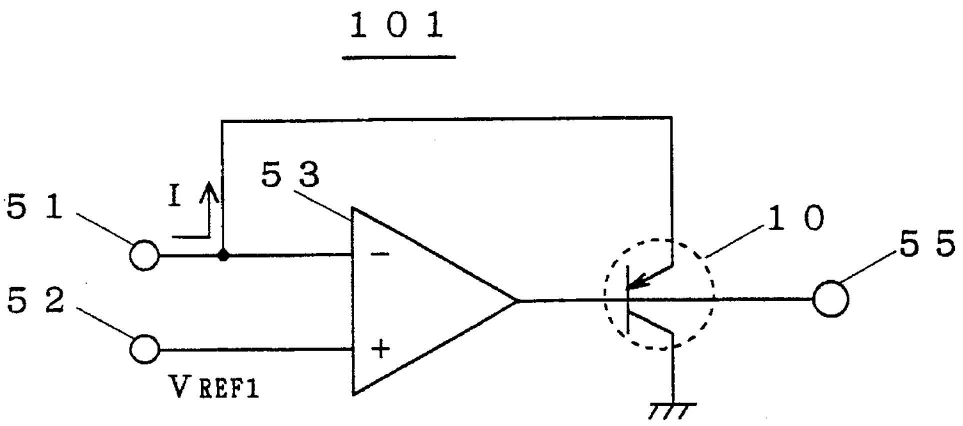
FIG. 1 is a circuitry diagram of a current-voltage conversion circuit according to a first preferred embodiment of the present invention.

FIG. 1 is a circuitry diagram of a current-voltage conversion circuit 101 according to a first preferred embodiment of the present invention. As in the conventional current-voltage conversion circuit 201, the reverse input terminal of the operational amplifier 53 is connected to the current input terminal 51 while the non-reverse input terminal of the operational amplifier 53 is connected to the first reference voltage input terminal 52, and the output terminal of the operational amplifier 53 is connected to the output terminal 55. However, the reverse input terminal of the operational amplifier 53 are connected to the output terminal of the operational amplifier 53 not via a diode but via a PNP transistor 10.

The PNP transistor 10 has its emitter connected to the reverse input terminal of the operational amplifier 53 and its base connected commonly to the output terminal 55 and the output terminal of the operational amplifier 53. A collector of the PNP transistor 10 is grounded. The PNP transistor 10 may be formed by CMOS processes.

Figure 2:
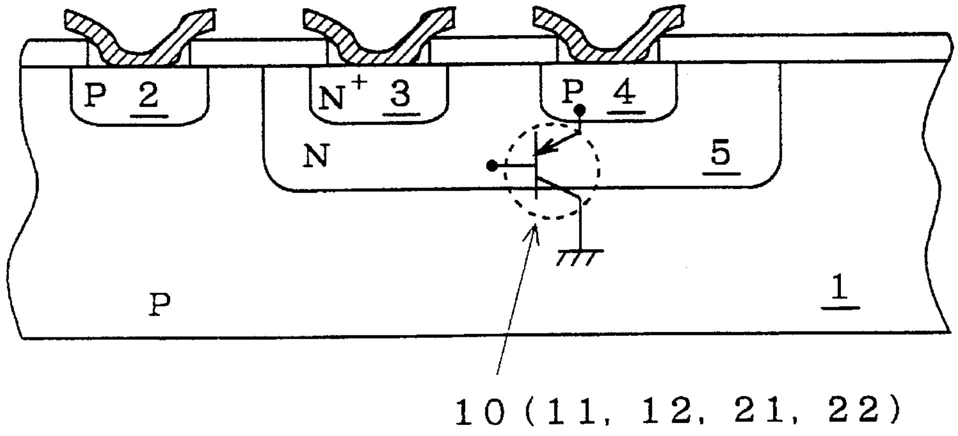
FIG. 2 is a cross-sectional view of a PNP transistor.

FIG. 2 is a cross-sectional view of the PNP transistor 10. An N-type well 5 is formed in a P-type silicon substrate 1, and an N-type diffusion layer 3 and a P-type diffusion layer 4 are formed in the N-type well 5. The impurity concentration of the N-type diffusion layer 3 is higher than that of the N-type well 5. On the other hand, in an upper portion of the P-type silicon substrate 1 where the N-type well 5 is not formed, a P-type diffusion layer 2 is formed.

Thus, the collector of the PNP transistor 10 is the P-type silicon substrate 1, the base of the PNP transistor 10 is the N-type well 5 and the emitter of the PNP transistor 10 is the P-type diffusion layer 4. The N-type diffusion layer 3 functions as a base electrode while the P-type diffusion layer 4 functions as an emitter electrode.

Since the P-type silicon substrate 1 is grounded, the collector of the PNP transistor 10 is also grounded. It is possible to form such a vertical type PNP transistor 10 using CMOS processes alone without using bipolar processes.

Figure 3:
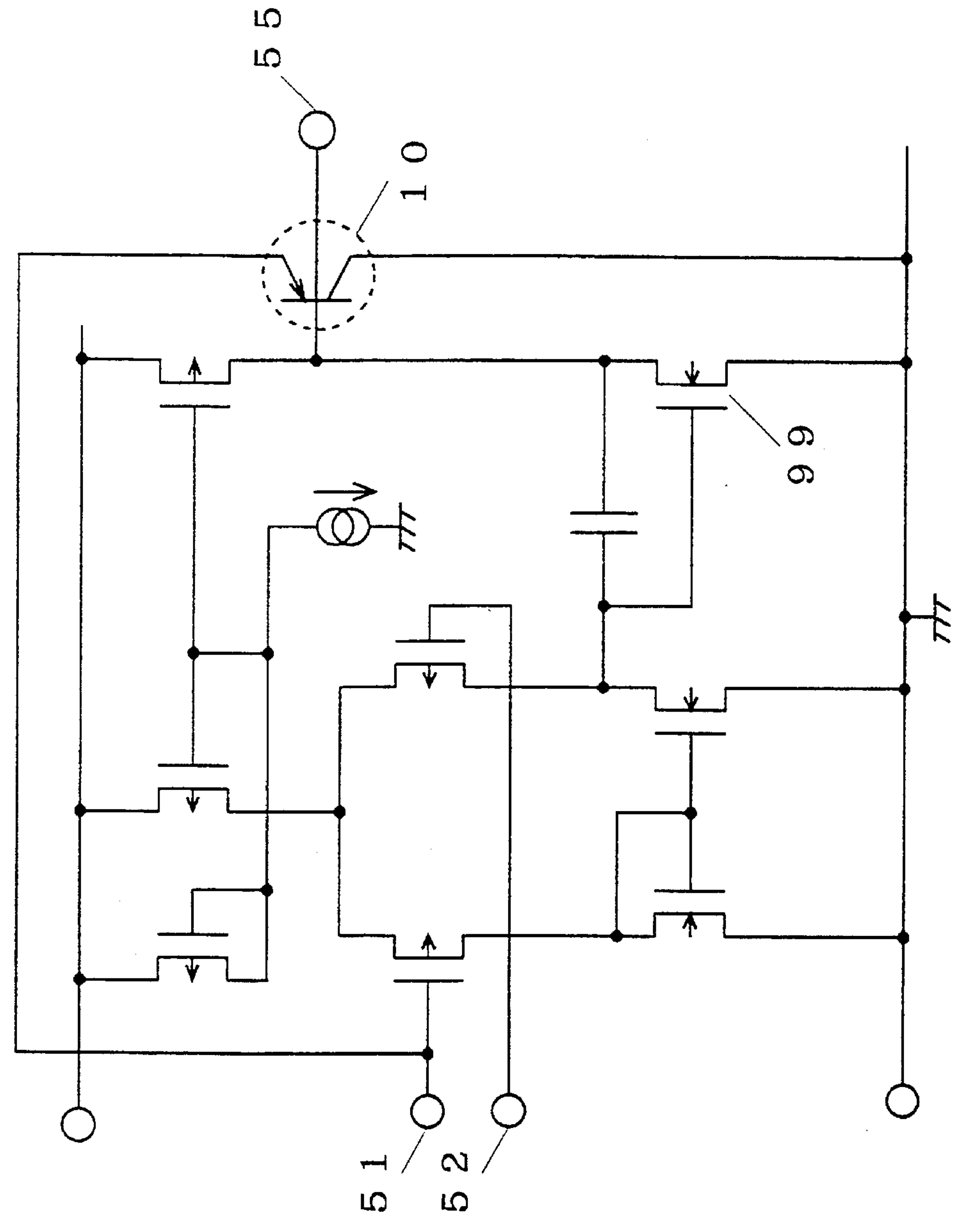
FIG. 3 is another circuitry diagram of the current-voltage conversion circuit of the first preferred embodiment.

FIG. 3 is a circuitry diagram showing the structure of the current-voltage conversion circuit 101 in more detail including an inner structure of the operational amplifier 53. The base of the PNP transistor 10 is connected to the output terminal of the operational amplifier 53, the emitter of the PNP transistor 10 is connected to the current input terminal 51 and the collector of the PNP transistor 10 is grounded. As a result, a current supplied to the current input terminal 51 is prevented from flowing as it is into a transistor 99 which is disposed at the most downstream position in the operational amplifier 53. Instead, the transistor 99 is provided with a current which has a value which is obtained by dividing the current supplied to the current input terminal 51 by a current amplification factor of the PNP transistor 10. Thus, the current allowed into the transistor 99 is reduced larger than in the conventional current-voltage conversion circuit 201. In short, the transistor 99 disposed at the most downstream position in the operational amplifier needs not be large in size.

In addition, it is possible to design the PNP transistor 10 so that Eq. 1 is satisfied between the current flowing in the emitter of the PNP transistor 10 and the emitter-base voltage $V_{BE}$ of the PNP transistor 10. Hence, the current-voltage conversion circuit 101 has the same characteristic as that of the conventional current-voltage conversion circuit 201.

Thus, according to the first preferred embodiment, a current-voltage conversion circuit for performing logarithmic compression is obtained using only CMOS processes. A characteristic of the current-voltage conversion circuit is not deteriorated even though bipolar processes are not used. Since bipolar processes are not necessary, the current-voltage conversion circuit is manufactured faster, which in turn makes it possible to fabricate an integrated circuit at a reduced cost.

(b-2) Second Preferred Embodiment

Figure 4:
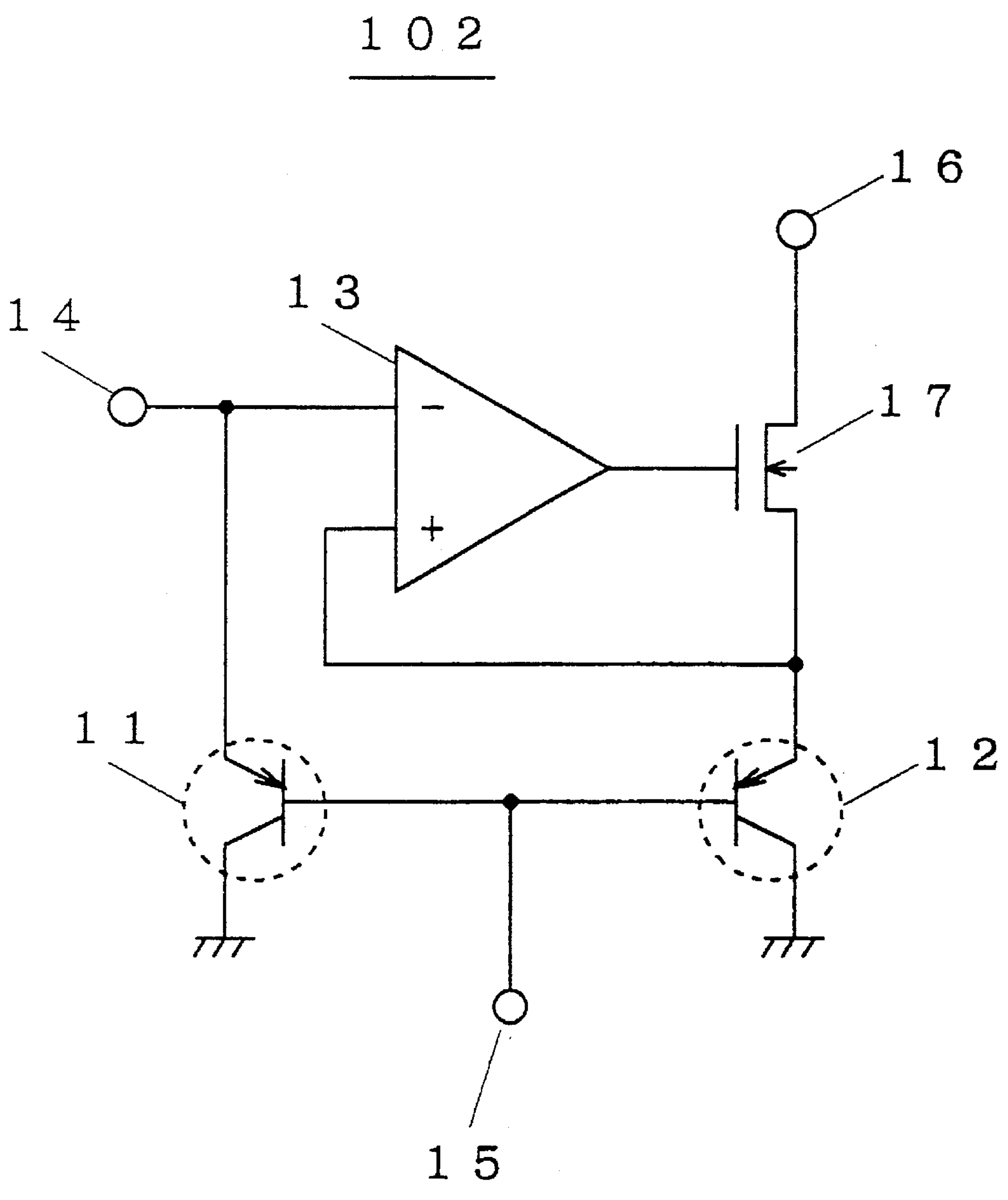
FIG. 4 is a circuitry diagram of a current compression and extension circuit according to a second preferred embodiment of the present invention.

FIG. 4 is a circuitry diagram of a current compression and extension circuit 102 according to a second preferred embodiment of the present invention. A current input terminal 14 is connected to a reverse input terminal of an operational amplifier 13. A drain of an N-channel MOS transistor 17 is connected to a non-reverse input terminal of the operational amplifier 13. An output terminal of the operational amplifier 13 is connected to a gate of the N-channel MOS transistor 17. A source of the N-channel MOS transistor 17 is connected to an output terminal 16.

A first reference voltage input terminal 15 is connected commonly to bases of PNP transistors 11 and 12. Collectors of the PNP transistors 11 and 12 are both grounded. An emitter of the PNP transistor 11 and the reverse input terminal of the operational amplifier 13 are connected to the current input terminal 14. An emitter of the PNP transistor 12 and the non-reverse input terminal of the operational amplifier 13 are connected to the drain of the N-channel MOS transistor 17.

When a current I is supplied to the current input terminal 14, since an impedance at the reverse input terminal of the operational amplifier 13 is very large, the current I flows into the emitter of the PNP transistor 11. Here, if a reference voltage $V_{REF1}$ is applied to the reference voltage input terminal 15, a potential at the reverse input terminal of the operational amplifier 13 becomes $V_{REF1}+V_{BE}$, whereby a potential at the emitter of the PNP transistor 12 also becomes $V_{BE}+V_{REF1}$. Hence, by forming the transistors 11 and 12 so as to each have a characteristic with which the current into the emitter becomes equal to the base-emitter voltage, the current I also flows into the emitter of the transistor 12 to eventually appear at the output terminal 16.

Figure 5:
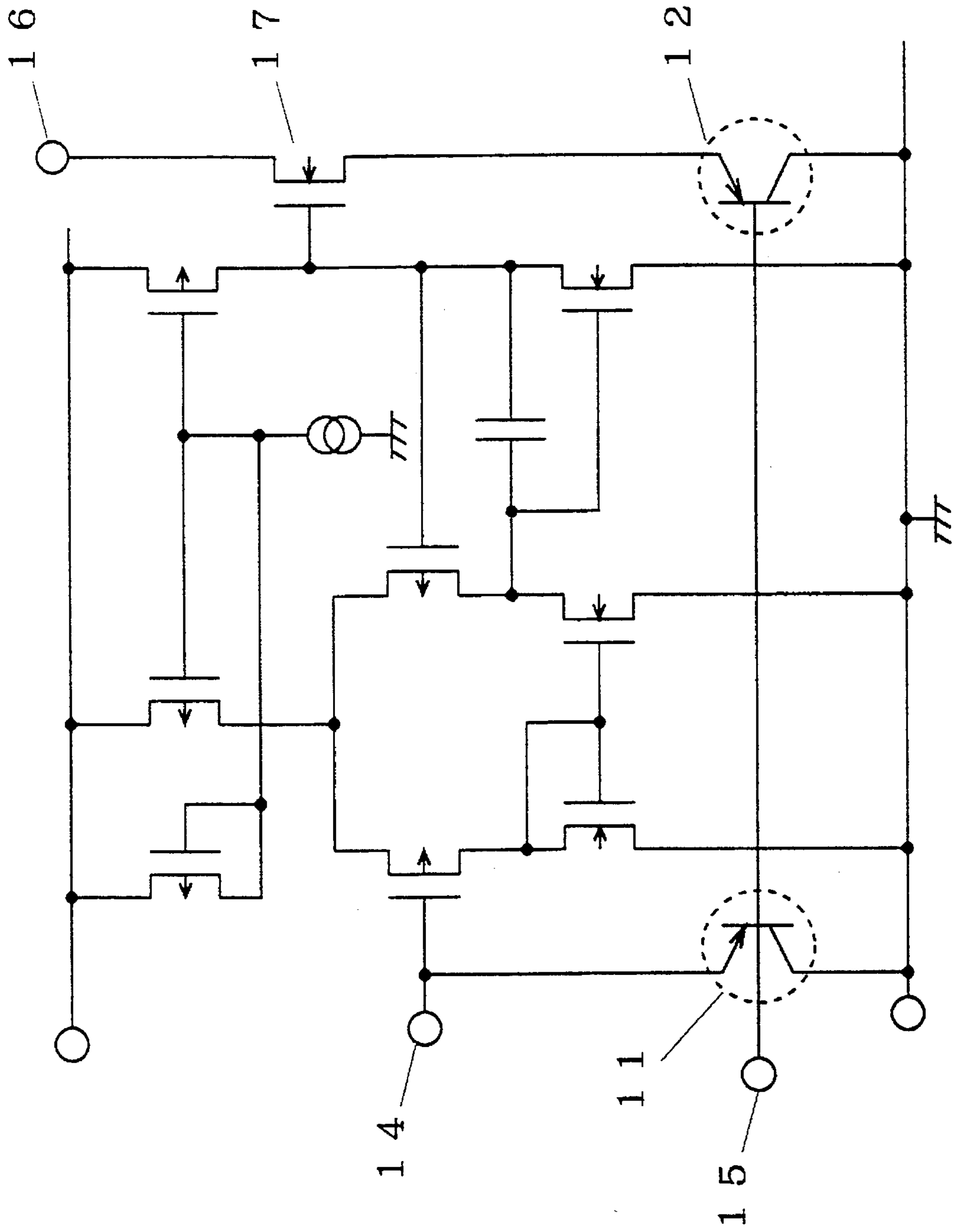
FIG. 5 is another circuitry diagram of the current compression and extension circuit.

FIG. 5 is a circuitry diagram showing the structure of the current compression and extension circuit 102 in more detail including an inner structure of the operational amplifier 13. The illustrated transistors 11 and 12 can be formed by a structure as that shown in FIG. 2.

Figure 6:
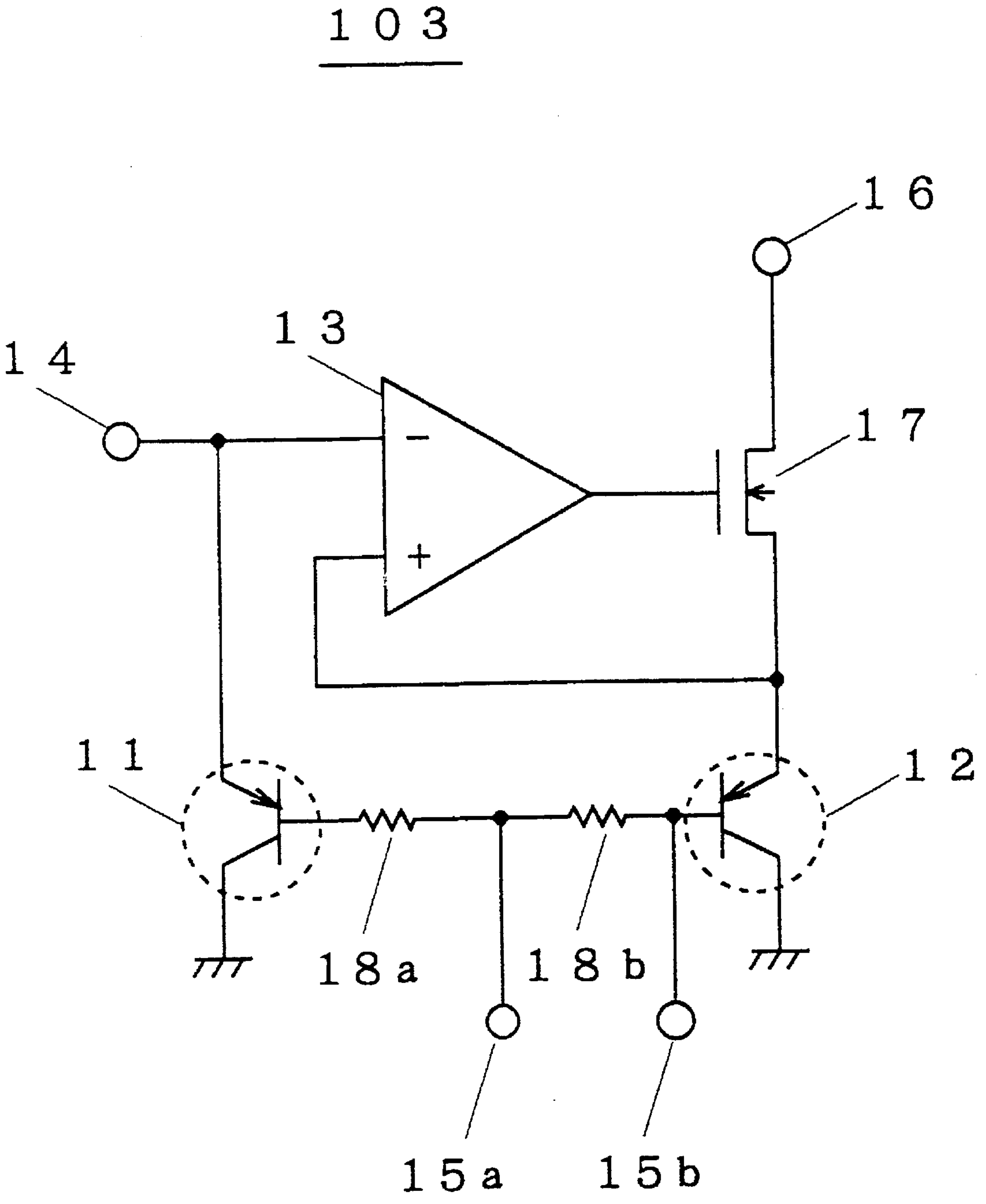
FIG. 6 is a circuitry diagram showing another current compression and extension circuit according to the second preferred embodiment of the present invention.

FIG. 6 is a circuitry diagram showing a structure of a current compression and extension circuit 103. The current compression and extension circuit 103 is equal to the current compression and extension circuit 102 as it is modified to insert resistors **18*a* and 18*b* between the bases of the transistors 11 and 12. A first reference voltage input terminal 15*a* is disposed at a connection point between the resistors 18*a* and 18*b* while a second first reference voltage input terminal 15*b* is disposed at a connection point between the base of the transistor 12 and the resistor 18*b***.

A current available from the output terminal 16 is adjusted by controlling voltages $V_{REF2}$ and $V_{REF1}$ which are applied respectively to the first and the second reference voltage input terminals **15*a* and 15*b***.

Figure 7:
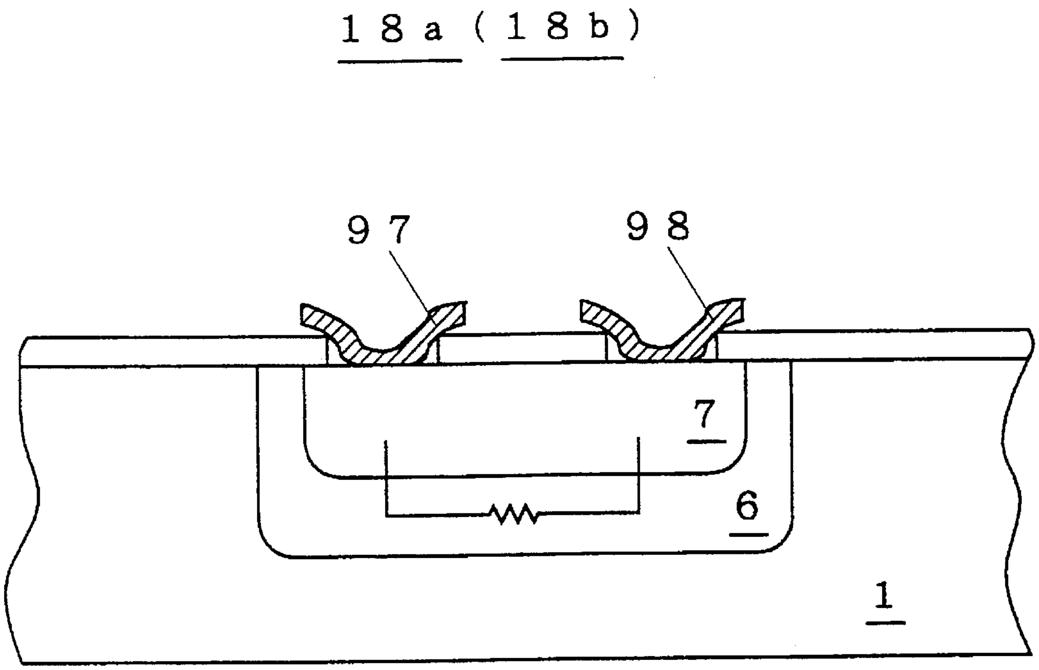
FIG. 7 is a cross-sectional view of resistors.

FIG. 7 is a cross-sectional view showing a structure in which the resistors **18*a* and 18*b* are formed using CMOS processes. An N-type well 6 is formed on a P-type silicon substrate 1 to include a P-type well 7. The P-type well 7 has electrodes 97 and 98 so that the P-type well 7** functions as a resistor element.

Thus, according to the second preferred embodiment, the current compression and extension circuit is manufactured using only CMOS processes. Hence, as in the first preferred embodiment, bipolar processes are not necessary, and therefore, the current-voltage conversion circuit is manufactured faster so that it is possible to fabricate an integrated circuit at a reduced cost.

(b-3) Third Preferred Embodiment

Figure 8:
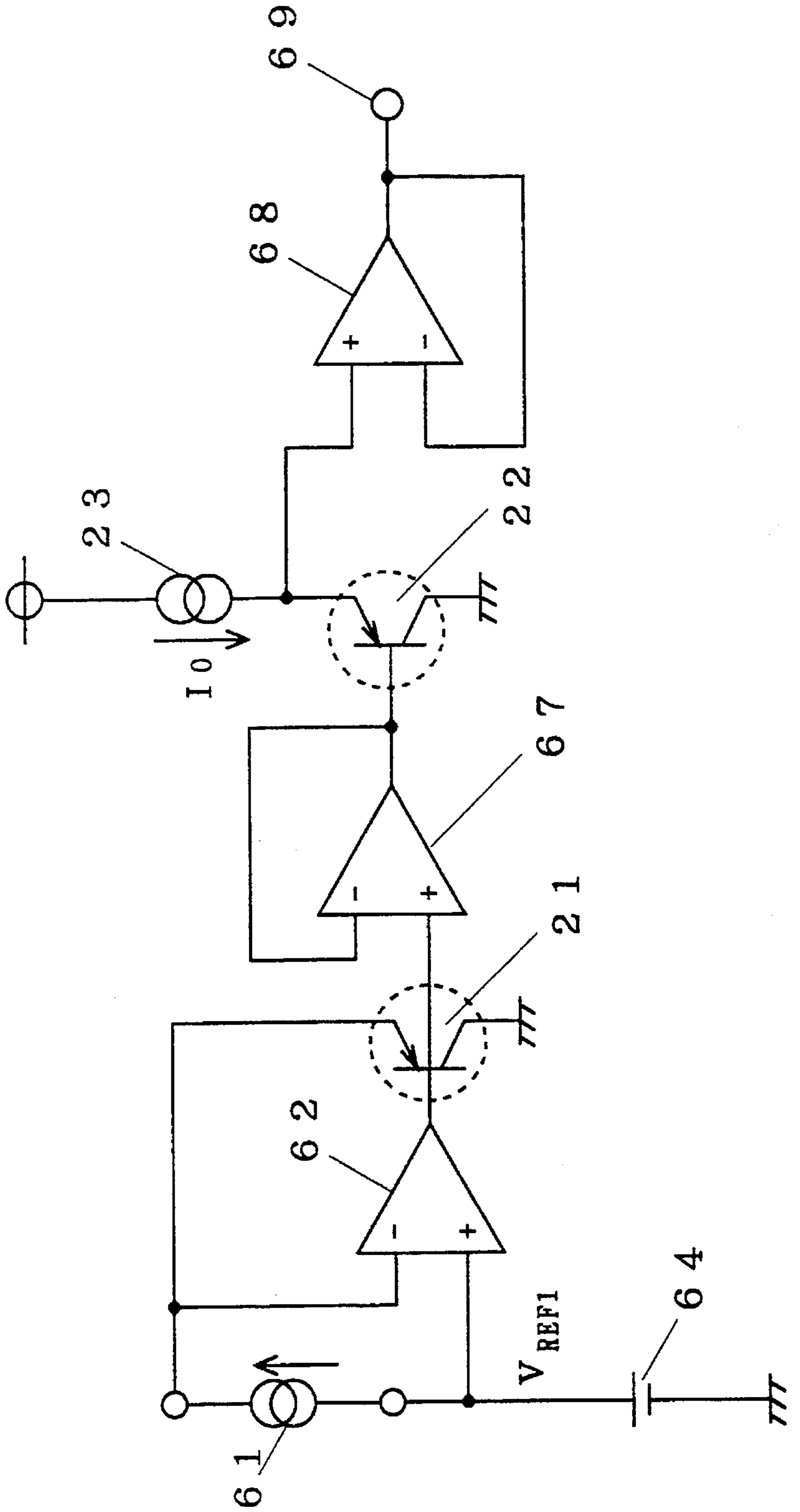
FIG. 8 is a circuitry diagram of an automatic exposure control system according to a third preferred embodiment of the present invention.

FIG. 8 is a circuitry diagram of an automatic exposure control system 104 according to a third preferred embodiment of the present invention. As in the conventional automatic exposure control system 203, the current source 61 is disposed between the reverse input terminal and the non-reverse input terminal of the operational amplifier 62, and the reference voltage $V_{REF1}$ is supplied from the voltage source 64 to the non-reverse input terminal of the operational amplifier 62.

However, the reverse input terminal and the output terminal of the operational amplifier 62 are connected to an emitter and a base of a PNP transistor 21, respectively. A collector of the PNP transistor 21 is grounded. Hence, a voltage $V_{62}$ expressed by Eq. 2 is available at the output terminal of the operational amplifier 62.

The output terminal of the operational amplifier 62 is connected to the non-reverse input terminal of the operational amplifier 67. The reverse input terminal and an output terminal of the operational amplifier 67 are connected to a base of a PNP transistor 22. A collector of the PNP transistor 22 is grounded while an emitter of the PNP transistor 22 is connected with a current source 23 to the non-reverse input terminal of the operational amplifier 68.

Since an input impedance at the non-reverse input terminal of the operational amplifier 68 is very large, most of a current supplied by the current source 23 flows into the emitter of the PNP transistor 22. Hence, by ensuring that the current source 23 supplies a current having a value $I_0$ and forming the PNP transistors 21 and 22 to each have a characteristic with which the current into the emitter becomes equal to the base-emitter voltage, a voltage $V_{68}$ expressed by Eq. 5 is obtained at the reverse input terminal of the operational amplifier 68.

$$V_{68} = V_{REF1} - \frac{kT}{q} \ln \frac{I}{I_0} \tag{5}$$

The automatic exposure control system according to the third preferred embodiment is formed using only CMOS processes because the transistors 21 and 22 are both formed by a structure as that shown in FIG. 2. Hence, as in the first preferred embodiment, bipolar processes are not necessary, and therefore, the current-voltage conversion circuit is manufactured faster so that it is possible to fabricate an integrated circuit at a reduced cost.

(b-4) Fourth Preferred Embodiment

Figure 9:
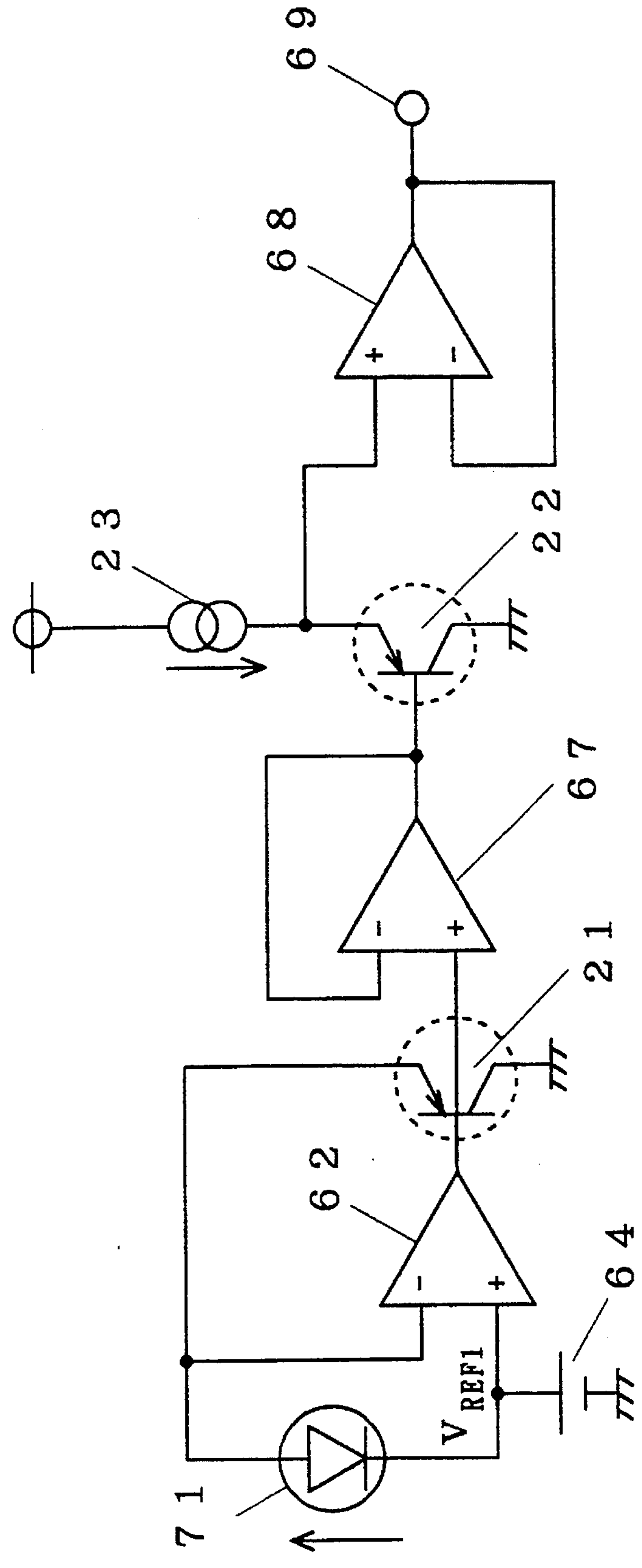
FIG. 9 is a circuitry diagram of an automatic exposure control system with a built-in sensor according to a fourth preferred embodiment of the present invention.

FIG. 9 is a circuitry diagram of an automatic exposure control system with a built-in sensor 105 according to a fourth preferred embodiment of the present invention. The automatic exposure control system with a built-in sensor 105 is the same as the automatic exposure control system 104 of FIG. 8 as it is modified to replace the current source 61 with an optical sensor 71. The optical sensor 71 is also obtained using only CMOS processes.

Figure 10:
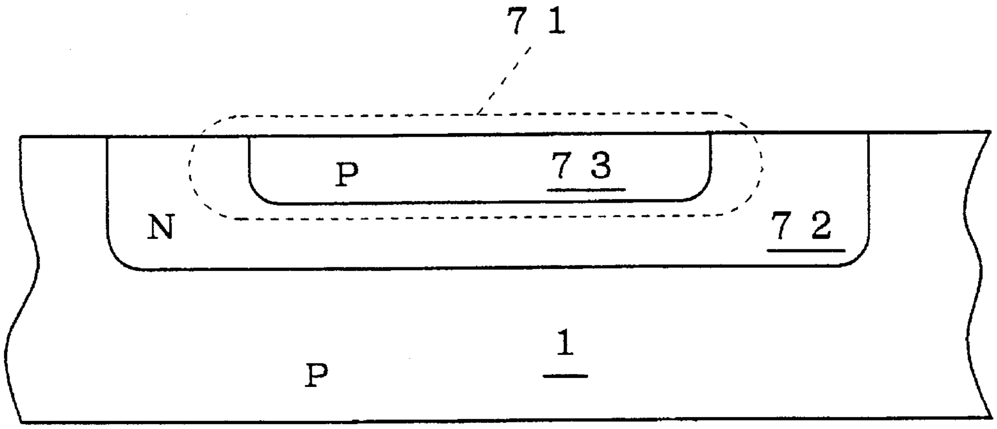
FIG. 10 is a cross-sectional view of an optical sensor.
Figure 11:
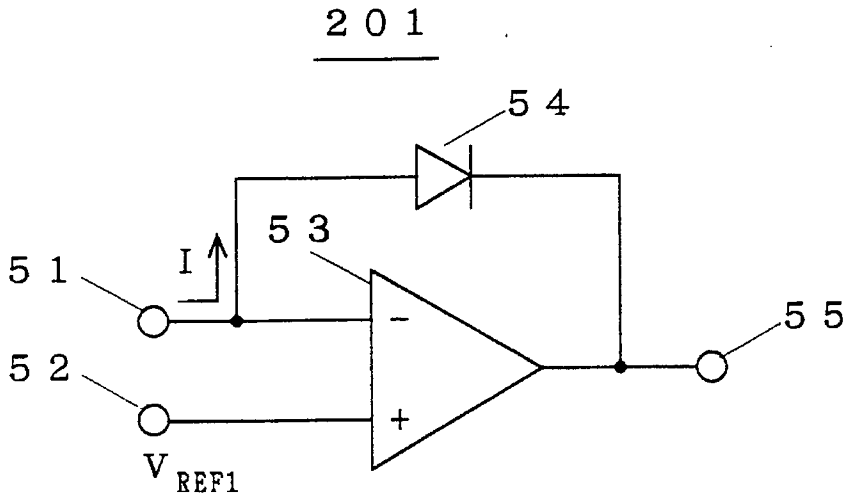
FIG. 11 PRIOR ART
FIG. 11 is a circuitry diagram of a conventional current-voltage conversion circuit.
Figure 12:
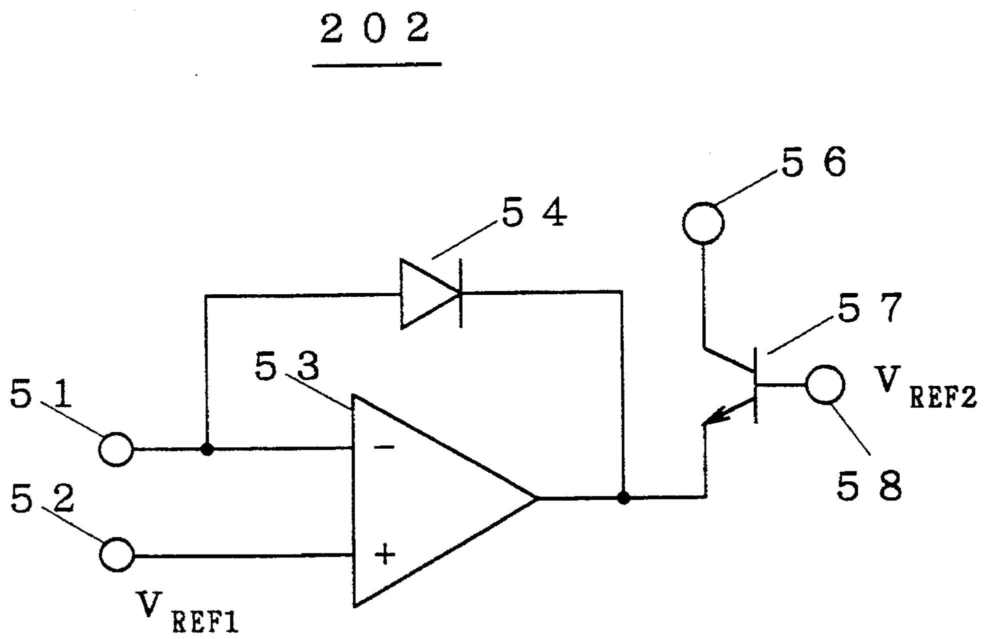
FIG. 12 PRIOR ART
FIG. 12 is a circuitry diagram of a conventional current compression and extension circuit.
Figure 13:
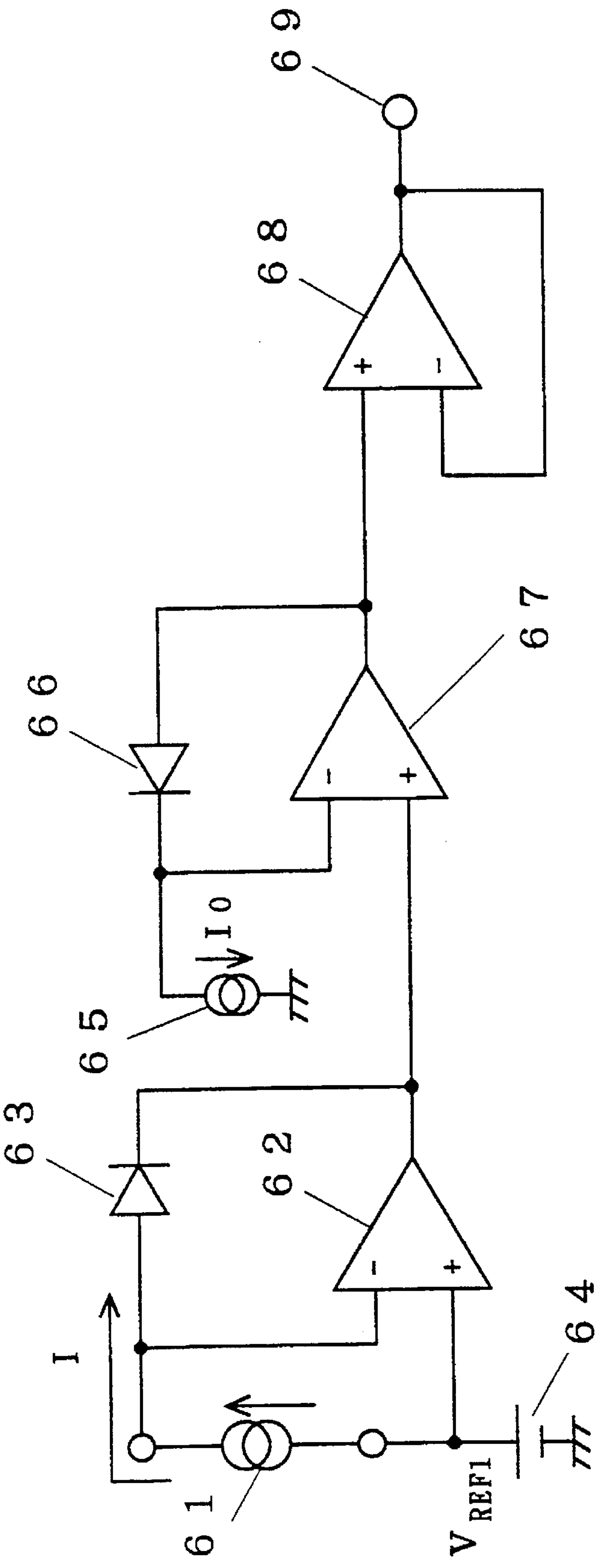
FIG. 13 PRIOR ART
FIG. 13 is a circuitry diagram of a conventional automatic exposure control system.
Figure 14:
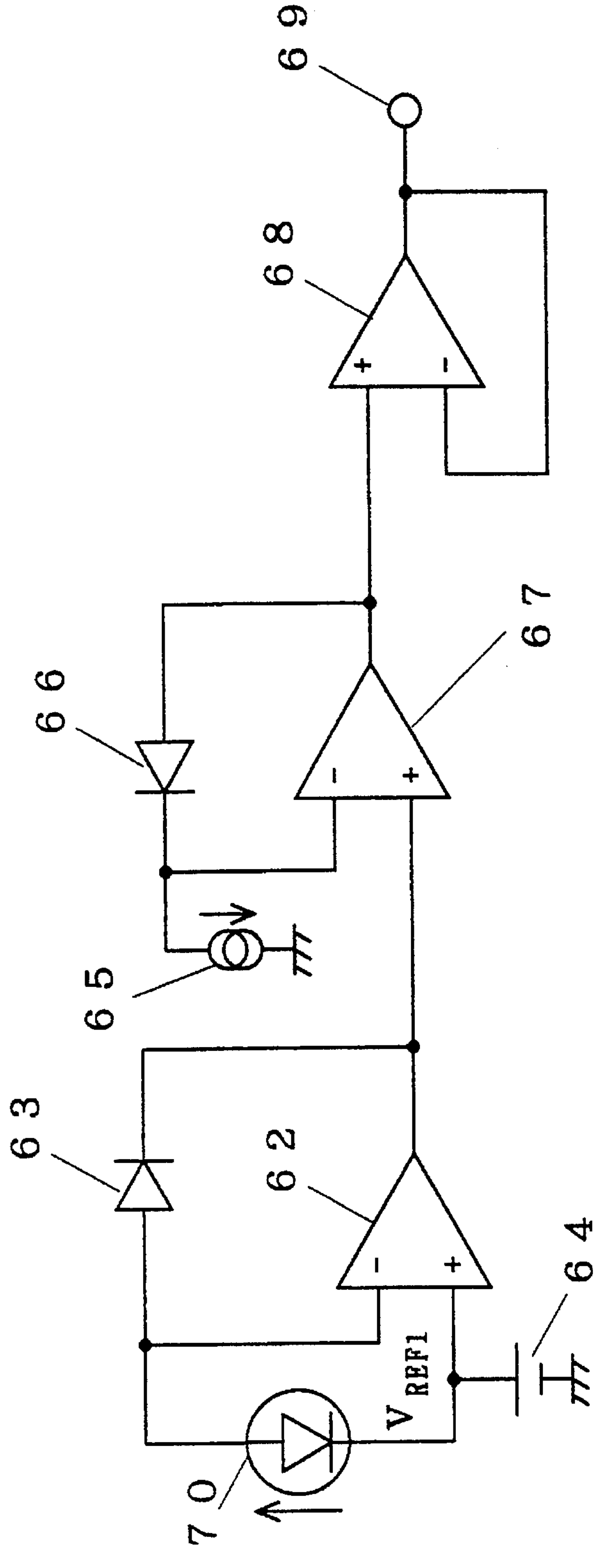
FIG. 14 PRIOR ART
FIG. 14 is a circuitry diagram of a conventional automatic exposure control system with a built-in sensor.

FIG. 10 is a cross-sectional view of the optical sensor 71 which is formed using CMOS processes. An N-type well 72 is formed in a P-type silicon substrate 1, and the N-type well 72 includes a P-type diffusion layer 73. At an interface between the N-type well 72 and the P-type diffusion layer 73, light is converted into a current. Since Eq. 5 is satisfied if the converted current has a value I, it is possible in the fourth preferred embodiment as well to build the automatic exposure control system with a built-in sensor using only CMOS processes. Hence, as in the first preferred embodiment, bipolar processes are not necessary, and therefore, the current-voltage conversion circuit is manufactured faster so that it is possible to fabricate an integrated circuit at a reduced cost.

While the invention has been described in detail, the foregoing description is in all aspects illustrative and not restrictive. It is understood that numerous other modifications and variations can be devised without departing from the scope of the invention.

We claim:

1. A current-voltage conversion circuit comprising:

(a) a current input terminal for receiving an input current;

(b) a reference voltage input terminal for receiving a reference voltage;

(c) an output terminal;

(d) an operational amplifier formed in a first conductivity type semiconductor substrate, said operational amplifier including a reverse input terminal which is connected to said current input terminal, a non-reverse input terminal which is connected to said reference voltage input terminal and an output terminal which is connected to said output terminal; and (e) a bipolar transistor including an emitter which is connected to said reverse input terminal of said operational amplifier, a base which is connected to said output terminal of said operational amplifier, and a collector, wherein said bipolar transistor is formed by:

(e-1) said semiconductor substrate which corresponds to said collector;

(e-2) a first diffusion layer of a second conductivity type selectively formed on said semiconductor substrate, said first diffusion layer corresponding to said base; and (e-3) a second diffusion layer of said first conductivity type selectively formed on said first diffusion layer, said second diffusion layer corresponding to said emitter.

2. A current compression and extension circuit comprising:

(a) a current input terminal for receiving an input current;

(b) a first reference voltage input terminal for receiving a first reference voltage;

(c) an output terminal;

(d) an operational amplifier formed in a first conductivity type semiconductor substrate, said operational amplifier including a reverse input terminal which is connected to said current input terminal, a non-reverse input terminal and an output terminal;

(e) a MOS transistor including a gate and a drain which are connected to said output terminal and said non-reverse input terminal of said operational amplifier, respectively, and a source which is connected to said output terminal, said MOS transistor receiving a voltage from said output terminal of said operational amplifier and forming a second conductivity type channel between said drain and said source;

(f) a first bipolar transistor including an emitter which is connected to said reverse input terminal of said operational amplifier, a base which is connected to said first reference voltage input terminal, and a collector; and (g) a second bipolar transistor including an emitter which is connected to said non-reverse input terminal of said operational amplifier, a base which is connected to said first reference voltage input terminal, and a collector, wherein said first bipolar transistor is formed by:

(f-1) said semiconductor substrate which corresponds to said collector of said first bipolar transistor;

(f-2) a first diffusion layer of a second conductivity type selectively formed on said semiconductor substrate, said first diffusion layer corresponding to said base of said first bipolar transistor; and (f-3) a second diffusion layer of said first conductivity type selectively formed on said first diffusion layer, said second diffusion layer corresponding to said emitter of said first bipolar transistor, and wherein said second bipolar transistor is formed by:

(g-1) said semiconductor substrate which corresponds to said collector of said second bipolar transistor;

(g-2) a third diffusion layer of said second conductivity type selectively formed on said semiconductor substrate, said third diffusion layer corresponding to said base of said second bipolar transistor; and (g-3) a fourth diffusion layer of said first conductivity type selectively formed on said third diffusion layer, said fourth diffusion layer corresponding to said emitter of said second bipolar transistor.

3. The current compression and extension circuit of claim 2, further comprising:

(h) a first resistor which is inserted between said base of said first bipolar transistor and said first reference voltage input terminal;

(i) a second resistor which is inserted between said base of said second bipolar transistor and said first reference voltage input terminal; and (j) a second reference voltage input terminal which is disposed at a connection point between said second resistor and said base of said second bipolar transistor, wherein said first resistor is formed by:

(h-1) a fifth diffusion layer of said second conductivity type selectively formed on said semiconductor substrate; and (h-2) a sixth diffusion layer of said first conductivity type selectively formed on said fifth diffusion layer, and wherein said second resistor is formed by:

(i-1) a seventh diffusion layer of said second conductivity type selectively formed on said semiconductor substrate; and (i-2) an eighth diffusion layer of said first conductivity type selectively formed on said fifth diffusion layer.

4. An automatic exposure control system comprising:

(a) a current input terminal for receiving an input current;

(b) a reference voltage input terminal for receiving a reference voltage;

(c) a first operational amplifier formed in a first conductivity type semiconductor substrate, said operational amplifier including a reverse input terminal which is connected to said current input terminal, a non-reverse input terminal which is connected to said reference voltage input terminal, and an output terminal;

(d) a first bipolar transistor including a base and an emitter which are connected to said output terminal and said reverse input terminal of said first operational amplifier, respectively, and a collector;

(e) a second operational amplifier formed in said semiconductor substrate, said second operational amplifier including a non-reverse input terminal which is connected to said output terminal of said first operational amplifier, a reverse input terminal and an output terminal which are commonly connected; and (f) a second bipolar transistor including a base which is connected to said output terminal of said second operational amplifier, an emitter which receives a predetermined current, and a collector, wherein said first bipolar transistor is formed by:

(d-1) said semiconductor substrate which corresponds to said collector of said first bipolar transistor;

(d-2) a first diffusion layer of a second conductivity type selectively formed on said semiconductor substrate, said first diffusion layer corresponding to said base of said first bipolar transistor; and (d-3) a second diffusion layer of said first conductivity type selectively formed on said first diffusion layer, said second diffusion layer corresponding to said emitter of said first bipolar transistor, and wherein said second bipolar transistor is formed by:

(f-1) said semiconductor substrate which corresponds to said collector of said second bipolar transistor;

(f-2) a third diffusion layer of said second conductivity type selectively formed on said semiconductor substrate, said third diffusion layer corresponding to said base of said second bipolar transistor; and (f-3) a fourth diffusion layer of said first conductivity type selectively formed on said third diffusion layer, said fourth diffusion layer corresponding to said emitter of said second bipolar transistor.

5. An automatic exposure control system with a built-in sensor comprising:

(a) a current input terminal for receiving an input current;

(b) a reference voltage input terminal for receiving a reference voltage;

(c) an optical sensor which is disposed between said reference voltage input terminal and said current input terminal;

(d) a first operational amplifier formed in a first conductivity type semiconductor substrate, said operational amplifier including a reverse input terminal which is connected to said current input terminal, a non-reverse input terminal which is connected to said reference voltage input terminal, and an output terminal;

(e) a first bipolar transistor including a base and an emitter which are connected to said output terminal and said reverse input terminal of said first operational amplifier, respectively, and a collector;

(f) a second operational amplifier formed in said semiconductor substrate, said second operational amplifier including a non-reverse input terminal which is connected to said output terminal of said first operational amplifier, a reverse input terminal and an output terminal which are commonly connected; and (g) a second bipolar transistor including a base which is connected to said output terminal of said second operational amplifier, an emitter which receives a predetermined current, and a collector, wherein said optical sensor includes:

(c-1) a first diffusion layer of a second conductivity type selectively formed on said semiconductor substrate; and (c-2) a second diffusion layer of said first conductivity type selectively formed on said first diffusion layer, said first bipolar transistor is formed by:

(e-1) said semiconductor substrate which corresponds to said collector of said first bipolar transistor;

(e-2) a third diffusion layer of said second conductivity type selectively formed on said semiconductor substrate, said third diffusion layer corresponding to said base of said first bipolar transistor; and (e-3) a fourth diffusion layer of said first conductivity type selectively formed on said third diffusion layer, said fourth diffusion layer corresponding to said emitter of said first bipolar transistor, and wherein said second bipolar transistor is formed by:

(g-1) said semiconductor substrate which corresponds to said collector of said second bipolar transistor;

(g-2) a fifth diffusion layer of said second conductivity type selectively formed on said semiconductor substrate, said fifth diffusion layer corresponding to said base of said second bipolar transistor; and (g-3) a sixth diffusion layer of said first conductivity type selectively formed on said fifth diffusion layer, said sixth diffusion layer corresponding to said emitter of said second bipolar transistor.

* * * * *